United States Patent
Burns et al.

(10) Patent No.: US 8,777,814 B2
(45) Date of Patent: Jul. 15, 2014

(54) TORQUE TRANSFER DEVICE FOR A MOTOR VEHICLE COMPRISING AN ELECTROMAGNETIC ACTUATOR POSITION CONTROL SYSTEM AND METHOD FOR CONTROLLING A RESPECTIVE POSITION CONTROL SYSTEM

(76) Inventors: Timothy M. Burns, Elbridge, NY (US); Hsing-Hua Fan, Rochester Hills, MI (US)

( * ) Notice: Subject to any disclaimer, the term of this patent is extended or adjusted under 35 U.S.C. 154(b) by 0 days.

(21) Appl. No.: 13/699,481

(22) PCT Filed: May 24, 2011

(86) PCT No.: PCT/US2011/037693
§ 371 (c)(1),
(2), (4) Date: Nov. 21, 2012

(87) PCT Pub. No.: WO2011/149905
PCT Pub. Date: Dec. 1, 2011

(65) Prior Publication Data
US 2013/0062154 A1 Mar. 14, 2013

Related U.S. Application Data

(60) Provisional application No. 61/347,911, filed on May 25, 2010.

(51) Int. Cl.
*B60W 10/02* (2006.01)
*B60W 10/04* (2006.01)

(52) U.S. Cl.
USPC .............................. 477/179; 477/174; 701/67

(58) Field of Classification Search
USPC ............... 477/166, 174, 179, 180; 701/67, 68
See application file for complete search history.

(56) References Cited

U.S. PATENT DOCUMENTS

| 4,895,236 A | 1/1990 | Sakakibara et al. |
| 5,323,871 A | 6/1994 | Wilson et al. |
| 5,407,024 A | 4/1995 | Watson et al. |
| 5,423,235 A | 6/1995 | Botterill et al. |
| 7,032,733 B2 * | 4/2006 | Parigger ................ 192/84.6 |
| 7,175,557 B2 * | 2/2007 | Kirkwood et al. ......... 475/150 |

(Continued)

FOREIGN PATENT DOCUMENTS

| DE | 102008021686 A1 | 11/2009 |
| DE | 102008026554 A1 | 12/2009 |

(Continued)

OTHER PUBLICATIONS

International Search Report and Written Opinion for PCT/US2011/037693 (in English), mailed Sep. 5, 2011; ISA/EP.

*Primary Examiner* — Tisha Lewis
(74) *Attorney, Agent, or Firm* — Dickinson Wright PLLC

(57) ABSTRACT

A torque transfer device (34) for a motor vehicle includes a clutch (50) for transferring torque between first and second shafts (76, 78). An electromagnetic actuator (98, 102) includes an axially moveable armature (102) for applying an application force to the clutch (50). An actuator control system includes a position sensor (118c) operable to output a signal indicative of a position of the armature (102). The control system determines a target torque to be transferred by the clutch (50) and a target armature position based on a previously determined clutch torque vs. armature position relationship. The control system varies an electrical input to the electromagnetic actuator (98, 102) to perform closed loop control of the armature position.

20 Claims, 9 Drawing Sheets

(56) References Cited

U.S. PATENT DOCUMENTS

| | | |
|---|---|---|
| 7,211,019 B2 * | 5/2007 | Kirkwood et al. ............ 475/205 |
| 2002/0134639 A1 | 9/2002 | Hori et al. |
| 2003/0019711 A1 | 1/2003 | Nekado et al. |
| 2005/0233858 A1 | 10/2005 | Smith et al. |
| 2011/0166760 A1 | 7/2011 | Kiessner-Haiden |

FOREIGN PATENT DOCUMENTS

| | | |
|---|---|---|
| JP | 62018117 A | 1/1987 |
| JP | 63066927 A | 3/1988 |
| JP | 11063018 A | 3/1999 |
| WO | 9311369 A1 | 6/1993 |

* cited by examiner

TORQUE TRANSFER DEVICE FOR A MOTOR VEHICLE COMPRISING AN ELECTROMAGNETIC ACTUATOR POSITION CONTROL SYSTEM AND METHOD FOR CONTROLLING A RESPECTIVE POSITION CONTROL SYSTEM

CROSS-REFERENCE TO RELATED APPLICATION

This U.S. National Stage Patent Application claims the benefit of International Application Number PCT/US2011/037693 filed May 24, 2011, which claims the benefit of U.S. Provisional Patent Application Ser. No. 61/347,911 filed May 25, 2010, the entire disclosures of the applications being considered part of the disclosure of this application and hereby incorporated by reference.

FIELD

The present disclosure relates generally to power transfer systems for controlling the distribution of drive torque between the front and rear drivelines of a four-wheel drive vehicle and/or the left and right wheel of an axle assembly. More particularly, the present disclosure is directed to a control system for an electromagnetic clutch actuator used in motor vehicle driveline applications.

BACKGROUND

In many vehicles, a power transmission device is operably installed between the primary and secondary drivelines. Such power transmission devices are typically equipped with a torque transfer mechanism which is operable for selectively and/or automatically transferring drive torque from the primary driveline to the secondary driveline to establish a four-wheel drive mode of operation.

A modern trend in four-wheel drive motor vehicles is to equip the power transmission device with a transfer clutch and an electronically-controlled traction control system. The transfer clutch is operable for automatically directing drive torque to the secondary wheels, without any input or action on the part of the vehicle operator, when traction is lost at the primary wheels for establishing an "on-demand" four-wheel drive mode. Typically, the transfer clutch includes a multi-plate clutch assembly that is installed between the primary and secondary drivelines and a clutch actuator for generating a clutch engagement force that is applied to the clutch plate assembly. The clutch actuator typically includes a power-operated device that is actuated in response to electric control signals sent from an electronic controller unit (ECU). Variable control of the electric control signal is frequently based on changes in the current operating characteristics of the vehicle (i.e., vehicle speed, interaxle speed difference, acceleration, steering angle, etc.) as detected by various sensors. Thus, such "on-demand" power transmission devices can utilize adaptive control schemes for automatically controlling torque distribution during all types of driving and road conditions.

A large number of on-demand power transmissions have been developed which utilize an electrically-controlled clutch actuator for regulating the amount of drive torque transferred through the clutch assembly to the secondary driveline as a function of the value of the electrical control signal applied thereto. In some applications, the transfer clutch employs an electromagnetic clutch as the power-operated clutch actuator. For example, U.S. Pat. No. 5,407,024 discloses an electromagnetic coil that is incrementally activated to control movement of a ball-ramp drive assembly for applying a clutch engagement force on the multi-plate clutch assembly. Likewise, Japanese Laid-open Patent Application No. 62-18117 discloses a transfer clutch equipped with an electromagnetic clutch actuator for directly controlling actuation of the multi-plate clutch pack assembly.

As an alternative, the transfer clutch may employ an electric motor and a drive assembly as the power-operated clutch actuator. For example, U.S. Pat. No. 5,323,871 discloses an on-demand transfer case having a transfer clutch equipped with an electric motor that controls rotation of a sector plate which, in turn, controls pivotal movement of a lever arm for applying the clutch engagement force to the multi-plate clutch assembly. Moreover, Japanese Laid-open Patent Application No. 63-66927 discloses a transfer clutch which uses an electric motor to rotate one cam plate of a ball-ramp operator for engaging the multi-plate clutch assembly. Finally, U.S. Pat. Nos. 4,895,236 and 5,423,235 respectively disclose a transfer case equipped with a transfer clutch having an electric motor driving a reduction gearset for controlling movement of a ball screw operator and a ball-ramp operator which, in turn, apply the clutch engagement force to the clutch pack.

While many on-demand clutch control systems similar to those described above are currently used in four-wheel drive vehicles, the cost and complexity of such systems may become excessive. In addition, control of the clutch actuation components may be challenging based on size, cost and power limitations imposed by the vehicle manufacturer. In an effort to address these concerns, simplified torque couplings are being considered for use in these applications.

SUMMARY

This section provides a general summary of the disclosure, and is not a comprehensive disclosure of its full scope or all of its features.

A torque transfer device for a motor vehicle includes a clutch for transferring torque between first and second shafts. An electromagnetic actuator includes an axially moveable armature for applying an application force to the clutch. An actuator control system includes a position sensor operable to output a signal indicative of a position of the armature. The control system determines a target torque to be transferred by the clutch and a target armature position based on a previously determined clutch torque vs. armature position relationship. The control system varies an electrical input to the electromagnetic actuator to perform closed loop control of the armature position.

In addition, a torque transfer device for a motor vehicle includes a clutch for transferring torque between first and second shafts. An electromagnetic actuator includes a main coil and an axially moveable armature for applying an application force to the clutch. An actuator control system includes a position sensor providing a signal indicative of a position of the armature. The control system is operable to vary an electrical input to the electromagnetic actuator to perform closed loop control of the armature position. An armature position verification system includes a search coil providing a signal indicative of a magnetic flux generated by the main coil. The verification system compares the magnetic flux and the corresponding armature position signal to a predetermined flux and armature position relationship to verify the armature position.

A method for controlling a magnetic actuator for a clutch transferring torque between first and second shafts of a power transmission device in a vehicle is also discussed. The method includes determining vehicle operating characteristics and determining a target clutch torque based on the operating characteristics. A target position of an armature within the actuator is determined based on the target torque. An actual armature position is determined based on a signal provided by a position sensor. The method includes determining whether the actual armature position is within a predetermined tolerance of the target armature position. Closed loop position feedback control is performed by varying an electrical input to the electromagnetic actuator to control the position of the armature based on a position sensor signal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The present disclosure is directed to a torque transfer mechanism that can be adaptively controlled to transfer torque between a first rotary member and a second rotary member. The torque transfer mechanism finds particular application in power transmission devices for use in motor vehicle drivelines such as, for example, a clutch in a transfer case or an in-line torque coupling or a disconnect associated with a differential unit in a transfer case or a drive axle assembly. Thus, while the present disclosure is hereinafter described in association with particular arrangements for use in specific driveline applications, it will be understood that the arrangements shown and described are merely intended to illustrate embodiments of the present disclosure.

Figure 1:
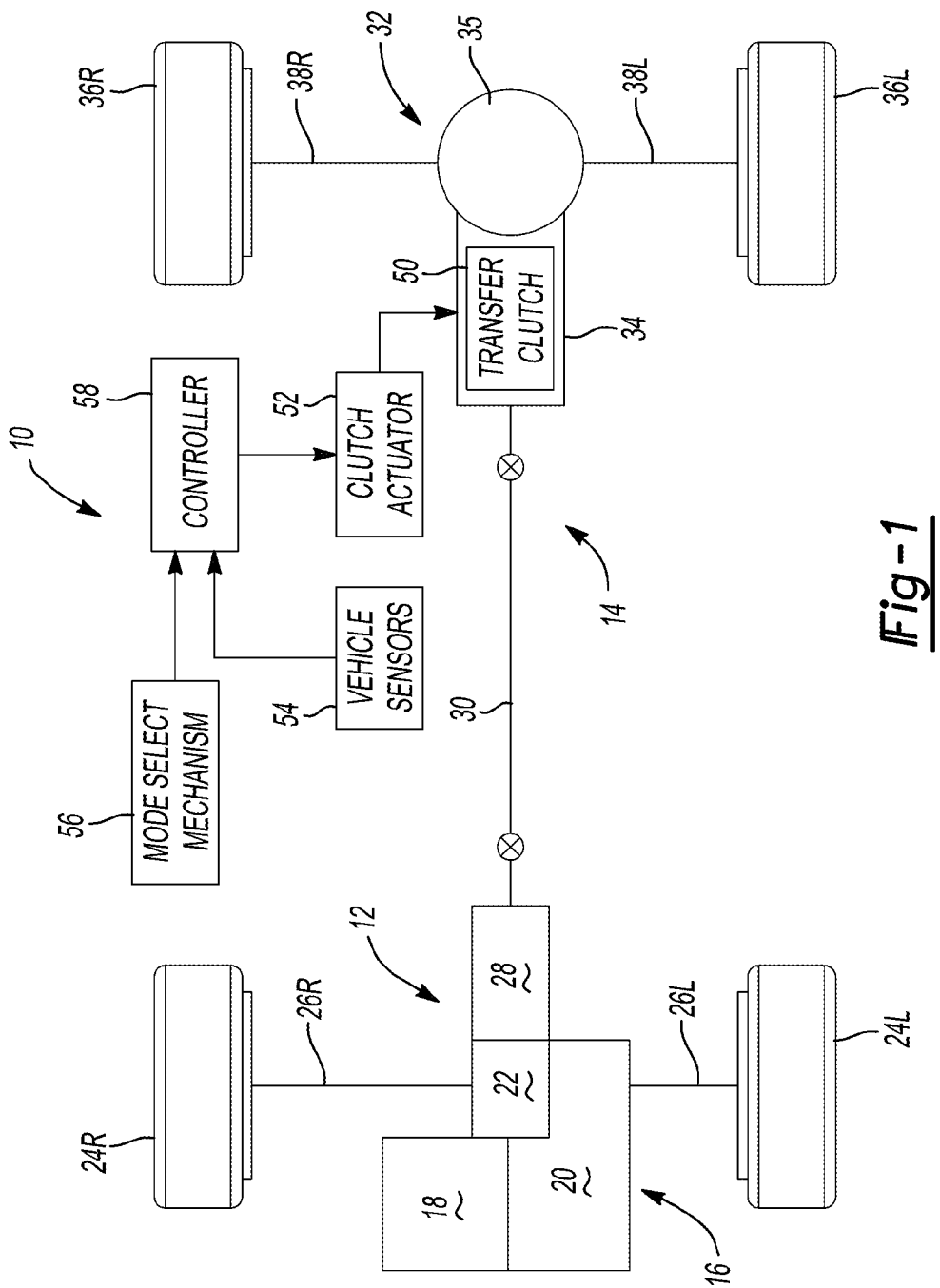
FIG. 1 is a schematic of an exemplary vehicle equipped with a torque coupling of the present disclosure.

With particular reference to FIG. 1 of the drawings, a drivetrain 10 for an all-wheel drive vehicle is shown. Drivetrain 10 includes a primary driveline 12, a secondary driveline 14, and a powertrain 16 for delivering rotary tractive power (i.e., drive torque) to the drivelines. In the particular arrangement shown, primary driveline 12 is the front driveline while secondary driveline 14 is the rear driveline. Powertrain 16 is shown to include an engine 18 and a multi-speed transmission 20. Front driveline 12 includes a front differential 22 driven by powertrain 16 for transmitting drive torque to a pair of front wheels 24L and 24R through a pair of front axleshafts 26L and 26R, respectively. Rear driveline 14 includes a power transfer unit 28 driven by powertrain 16 or differential 22, a propshaft 30 driven by power transfer unit 28, a rear axle assembly 32 and a power transmission device 34 for selectively transferring drive torque from propshaft 30 to rear axle assembly 32. Rear axle assembly 32 is shown to include a rear differential 35, a pair of rear wheels 36L and 36R and a pair of rear axleshafts 38L and 38R that interconnect rear differential 35 to corresponding rear wheels 36L and 36R.

With continued reference to the drawings, drivetrain 10 is shown to further include an electronically-controlled power transfer system for permitting a vehicle operator to select a two-wheel drive mode, a locked ("part-time") four-wheel drive mode or an "on-demand" mode. In this regard, power transmission device 34 is equipped with a transfer clutch 50 that can be selectively actuated for transferring drive torque from propshaft 30 to rear axle assembly 32 for establishing the part-time and on-demand four-wheel drive modes. The power transfer system further includes a power-operated clutch actuator 52 for actuating transfer clutch 50, vehicle sensors 54 for detecting certain dynamic and operational characteristics of the motor vehicle, a mode select mechanism 56 for permitting the vehicle operator to select one of the available drive modes, and a controller 58 for controlling actuation of clutch actuator 52 in response to input signals from vehicle sensors 54 and mode select mechanism 56.

Figure 2:
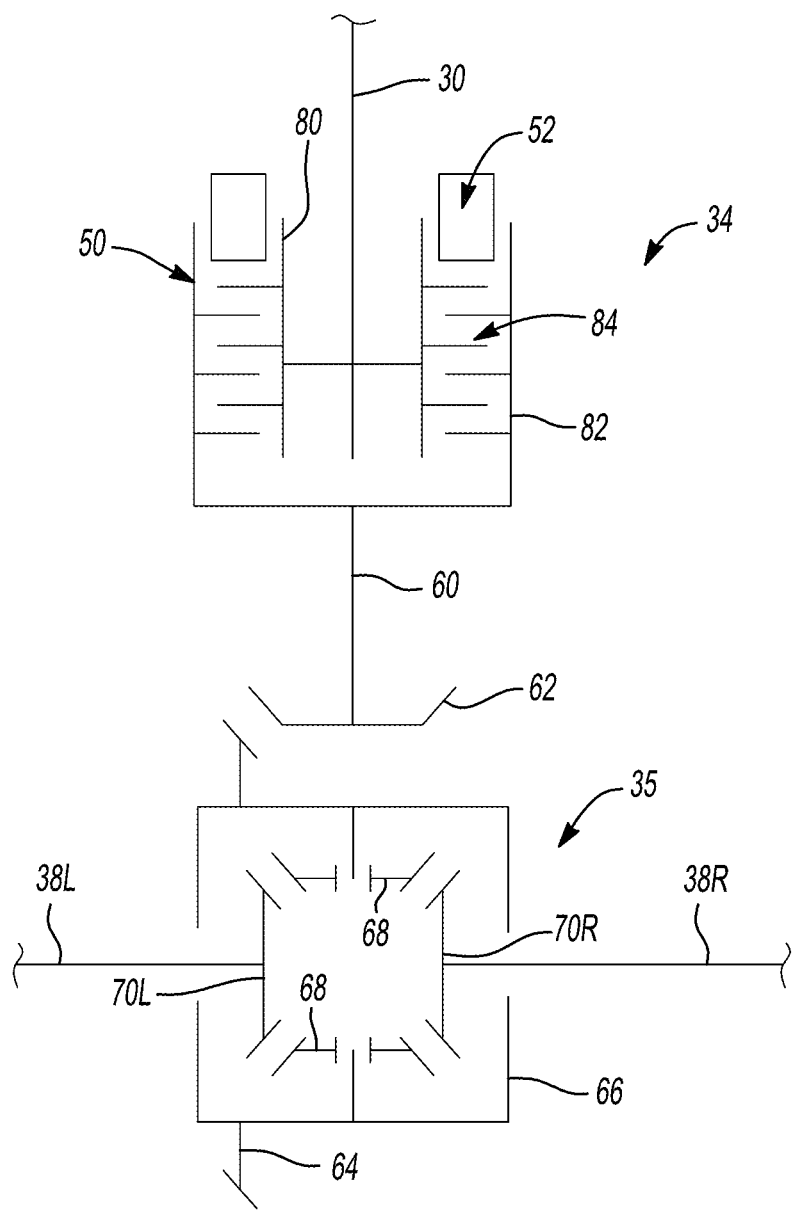
FIG. 2 is a schematic illustration of the torque coupling shown in FIG. 1 associated with a drive axle assembly.

Power transmission device 34, hereinafter referred to as torque coupling 34, is shown schematically in FIG. 2 to be operably disposed between propshaft 30 and a pinion shaft 60. As seen, pinion shaft 60 includes a pinion gear 62 that is meshed with a hypoid ring gear 64 that is fixed to a differential case 66 of rear differential 35. Differential 35 is conventional in that pinions 68 driven by case 66 are arranged to drive side gears 70L and 70R which are fixed for rotation with corresponding axleshafts 38L and 38R. Torque coupling 34 is shown to include transfer clutch 50 and clutch actuator 52 arranged to control the transfer of drive torque from propshaft 30 to pinion shaft 60 and which together define the torque transfer mechanism of the present disclosure.

Figure 3:
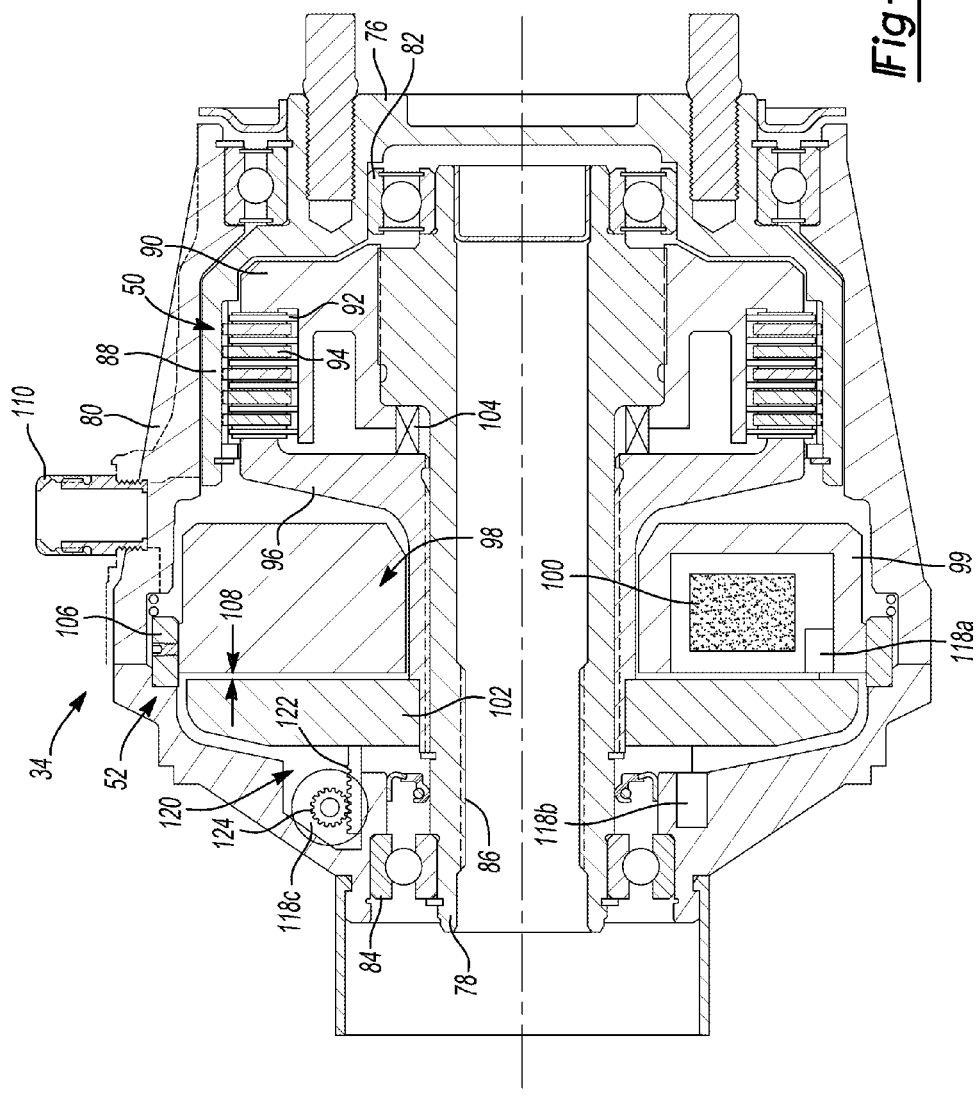
FIG. 3 is a sectional view of the torque coupling.

Referring primarily to FIG. 3, the components and function of torque coupling 34 will be disclosed in detail. As seen, torque coupling 34 generally includes a rotary input member 76 and a rotary output member 78 supported for rotation relative to one another within a housing 80 by a bearing 82. Another bearing 84 supports rotary output member 78 within housing 80. Rotary input member 76 is fixed for rotation with propshaft 30. Rotary output member 78 is fixed for rotation with pinion shaft 60 via a spline 86.

Transfer clutch 50 includes a drum 88 integrally formed with rotary input member 76. A hub 90 is fixed for rotation with rotary output member 78. A plurality of inner clutch plates 92 are fixed for rotation with hub 90. A plurality of outer clutch plates 94 are fixed for rotation with drum 88. Inner and outer clutch plates 92, 94 are interleaved with one another. An apply plate 96 is fixed for rotation with and axially moveable relative to rotary output member 78.

Clutch actuator 52 includes a coil assembly 98 including a housing or core 99 fixedly mounted within housing 80. A main coil 100 is positioned with cup-shaped core 99. An axially moveable armature 102 is fixed to apply plate 96 and positioned in close proximity to coil assembly 98. A return spring 104 biases apply plate 96 away from inner and outer clutch plates 92, 94. In similar fashion, spring 104 biases armature away from coil assembly 98.

Apply plate 96 and armature 102 are moveable from a retracted position shown in FIG. 3 to an advanced position where apply plate 96 compresses inner clutch plates 92 and outer clutch plates 94 together to transfer torque across transfer clutch 50. The position of coil assembly 98 may be varied through the use of an adjustment mechanism 106 interconnecting core 99 and housing 80. As such, a gap 108 between armature 102 and coil assembly 98 may be adjusted prior to the completion of assembly of torque coupling 34 to account for various dimensional tolerances of the torque coupling components. A wire terminal 110 is fixed to housing 80 and contains wires for the supply of current to main coil 100.

Controller 58 is in electrical communication with coil assembly 98. Torque coupling 34 may be operated in a torque transferring mode by passing current through coil assembly 98 in response to a command from controller 58. A magnetic flux is formed along a closed magnetic circuit including core 99 and armature 102, that are made from magnetic materials. Armature 102 is attracted toward coil assembly 98. As a result, apply plate 96 compresses inner clutch plates 92 with outer clutch plates 94 to transfer torque between rotary input member 76 and rotary output member 78.

An actuator control system includes controller 58, vehicle sensors 54 and a position sensor 118. FIG. 3 depicts three different arrangements of sensor 118 identified at reference numerals 118a, 118b and 118c. It is contemplated that sensor 118 may be a linear variable displacement transducer, a linear potentiometer, a hall effect sensor, an optical sensor using laser or infrared emissions, an ultrasound sensor or the like.

Sensor 118a is embedded within coil assembly 98 and fixed to core 99. Sensor 118a is operable to measure a position of armature 102 relative to coil assembly 98 or an absolute measurement of gap 108. Sensor 118 may be alternatively located at the location depicted as 118b.

Sensor 118b is fixed to housing 80 and is operable to directly measure movement of armature 102 relative to housing 80. Because coil assembly 98 is also fixed to housing 80, a relative measurement of gap 108 may be obtained through the use of sensor 118b.

Sensor 118c may be fixed to housing 80 and cooperate with a multiplier 120 useful for amplifying the travel in armature 102 to provide greater resolution for the control of position. More particularly, multiplier 120 is depicted as a rack 122 fixed to armature 102. A pinion gear 124 is meshingly engaged with rack 122 such that axial translation of rack 122 causes rotation of pinion gear 124. Sensor 118c detects changes in the rotary position of pinion gear 124. It is contemplated that other multipliers such as a lever system may be used in lieu of the rack and pinion arrangement depicted in FIG. 3.

Figure 4:
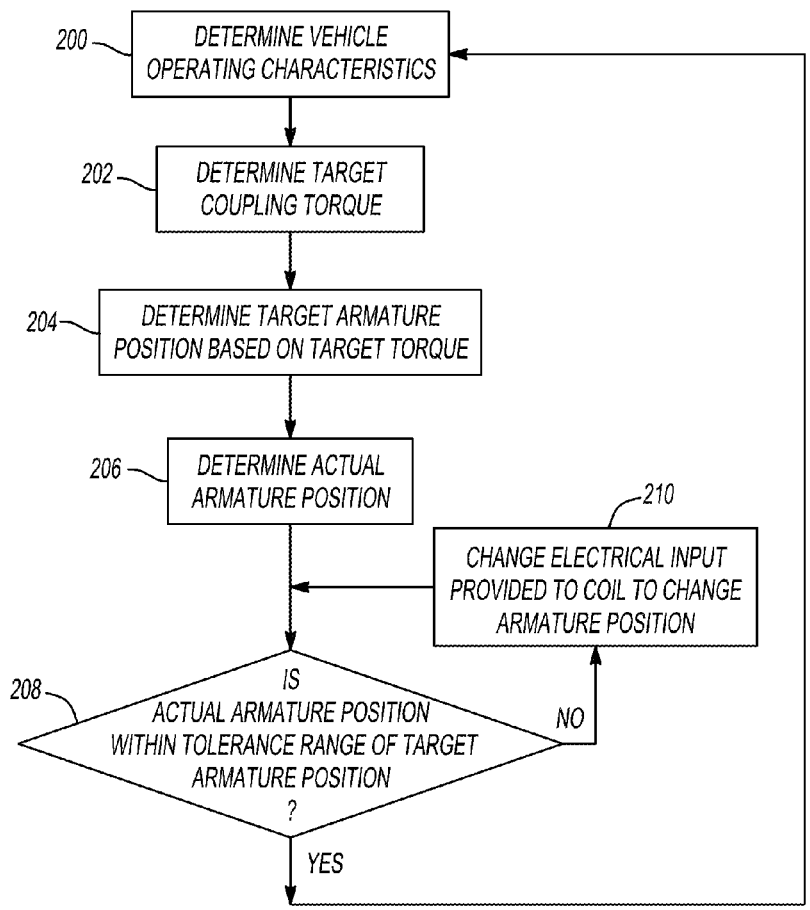
FIG. 4 is a flow diagram depicting torque coupling control.

FIG. 4 provides a logic flow diagram relating to the control of torque coupling 34. At block 200, vehicle sensors 54 provide signals indicative of driver inputs and various vehicle operating characteristics to controller 58. The signals may indicate vehicle speed, individual wheel speeds, transmission gear ratio, steering angle, engine speed, throttle position, ambient temperature, and slip speed between input member 76 and output member 78 among other vehicle characteristics. At block 202, a target torque to be transferred across torque coupling 34 is determined based upon the vehicle operating characteristics and driver inputs. The target torque may include a magnitude of zero torque where torque transfer across torque coupling 34 is not desired.

Figure 5:
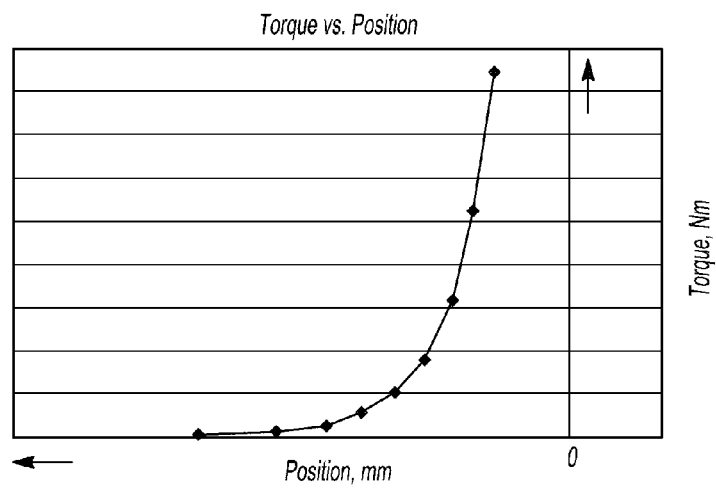
FIG. 5 is a graph depicting coupling torque vs. armature position.

At block 204, a target position of armature 102 is determined based on the target torque determined at block 202. Controller 58 may be programmed with or have access to a look-up table or may execute an algorithm of a previously determined relationship between armature position and coupling torque as illustrated at FIG. 5. It is contemplated that the armature position vs. torque trace may be empirically generated by applying a number of different electrical inputs having various magnitudes to main coil 100. The resulting position and torque relationship is saved in the look-up table. In one arrangement, application of current to main coil 100 may be set at a 100% PWM duty cycle and a number of different resistors may be added to the circuit to provide discrete electrical input magnitudes to main coil 100. The position of armature 102 and the coupling torque associated with each different magnitude of input are stored.

At block 206, an actual armature position is determined based on the output of one of position sensors 118a, 118b or 118c.

At block 208, the actual armature position is compared to the target armature position. If the actual armature position is within a predetermined tolerance range of the target armature position, control returns to block 200. If the actual armature position is outside of the tolerance range of the target armature position, controller 58 varies an electrical input to coil assembly 98 to change the armature position in an attempt to meet the target armature position at block 210. Control returns to block 206 where the new actual position is compared to the target armature position. Closed loop position control continues until the conditions of block 208 have been met.

Figure 6:
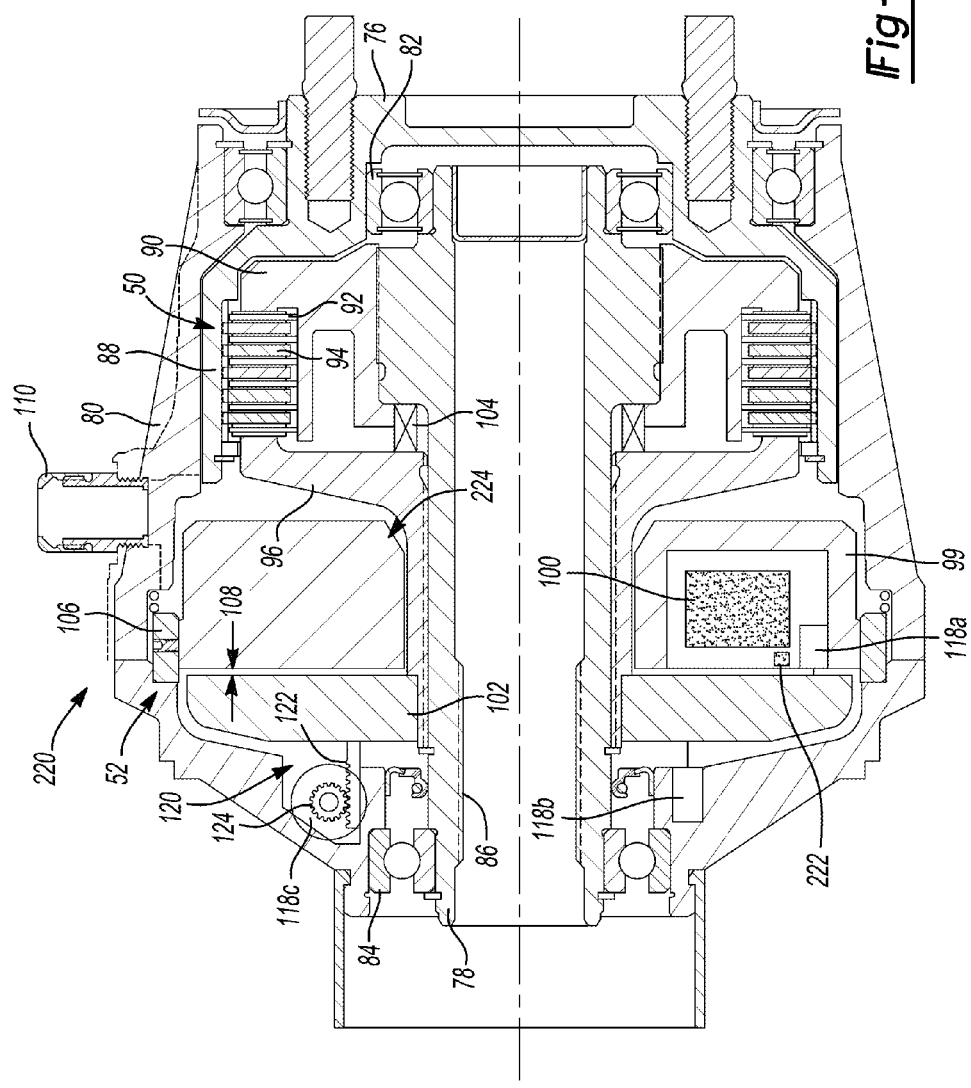
FIG. 6 is a sectional view of another torque coupling.

FIG. 6 represents an alternate torque coupling 220 including a search coil 222 embedded within a coil assembly 224. Coil assembly 224 is substantially similar to coil assembly 98 with the addition of search coil 222. The remaining components of torque coupling 220 are substantially similar to torque coupling 34. Accordingly, similar elements will retain the earlier introduced reference numerals. Search coil 222 is positioned proximate main coil 100 such that a magnetic flux density $\phi$ is generated along the magnetic circuit when current is supplied to main coil 100. An induced electromotive force, V, is generated in search coil 222 in response to the change in magnetic flux intensity. The induced electromotive force generated in search coil 222 is input to controller 58.

Figure 7:
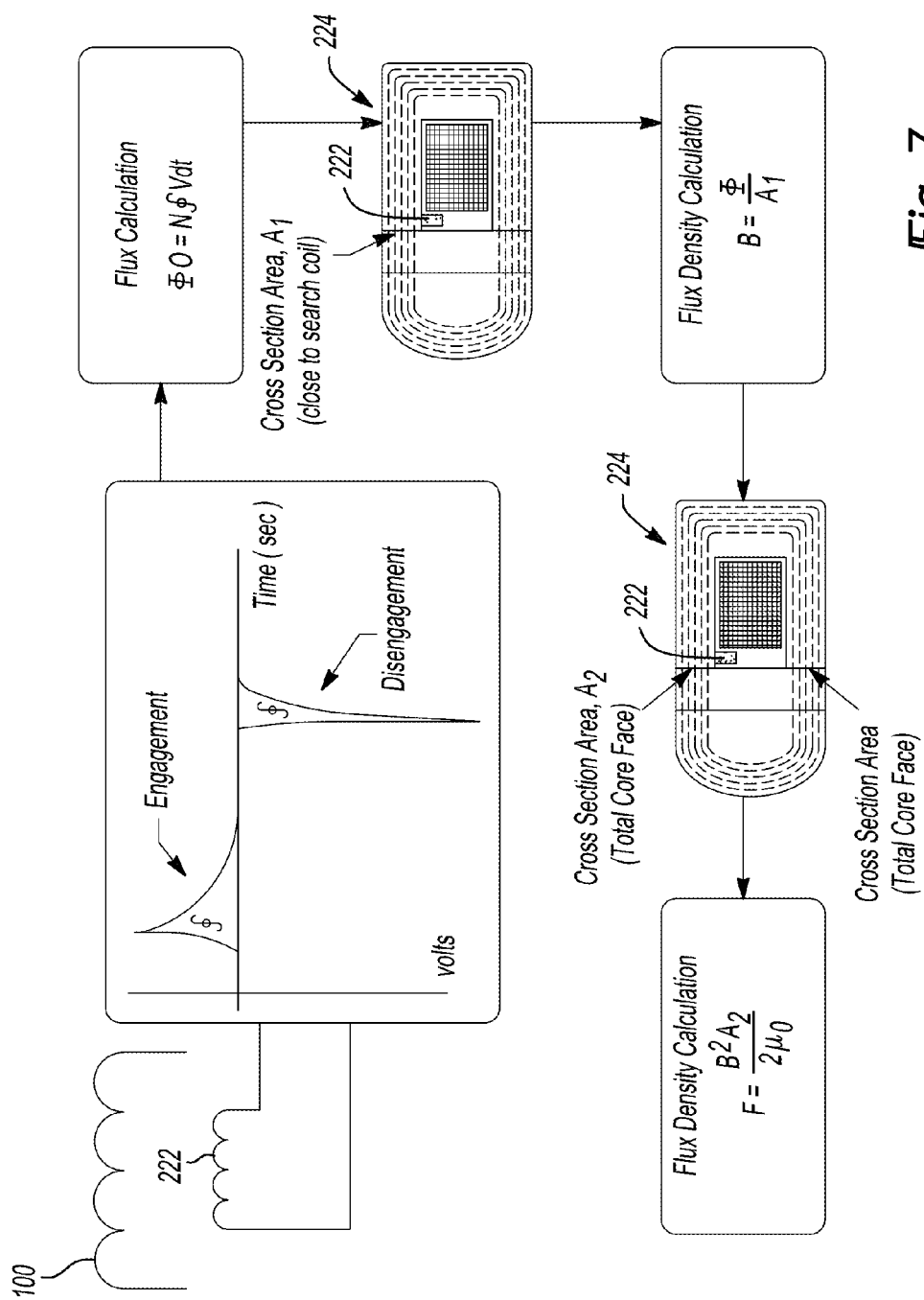
FIG. 7 is a schematic depicting magnetic flux calculation.

FIG. 7 depicts the induced electromotive force that occurs during initial current supply to main coil 100 and engagement of apply plate 96 with inner and outer clutch plates 92, 94. Another induced electromotive force occurs when power supply is discontinued to main coil 100. When the supply of power to main coil 100 is ceased, spring 104 causes apply plate 96 to disengage inner and outer clutch plates 92, 94.

Figure 8:
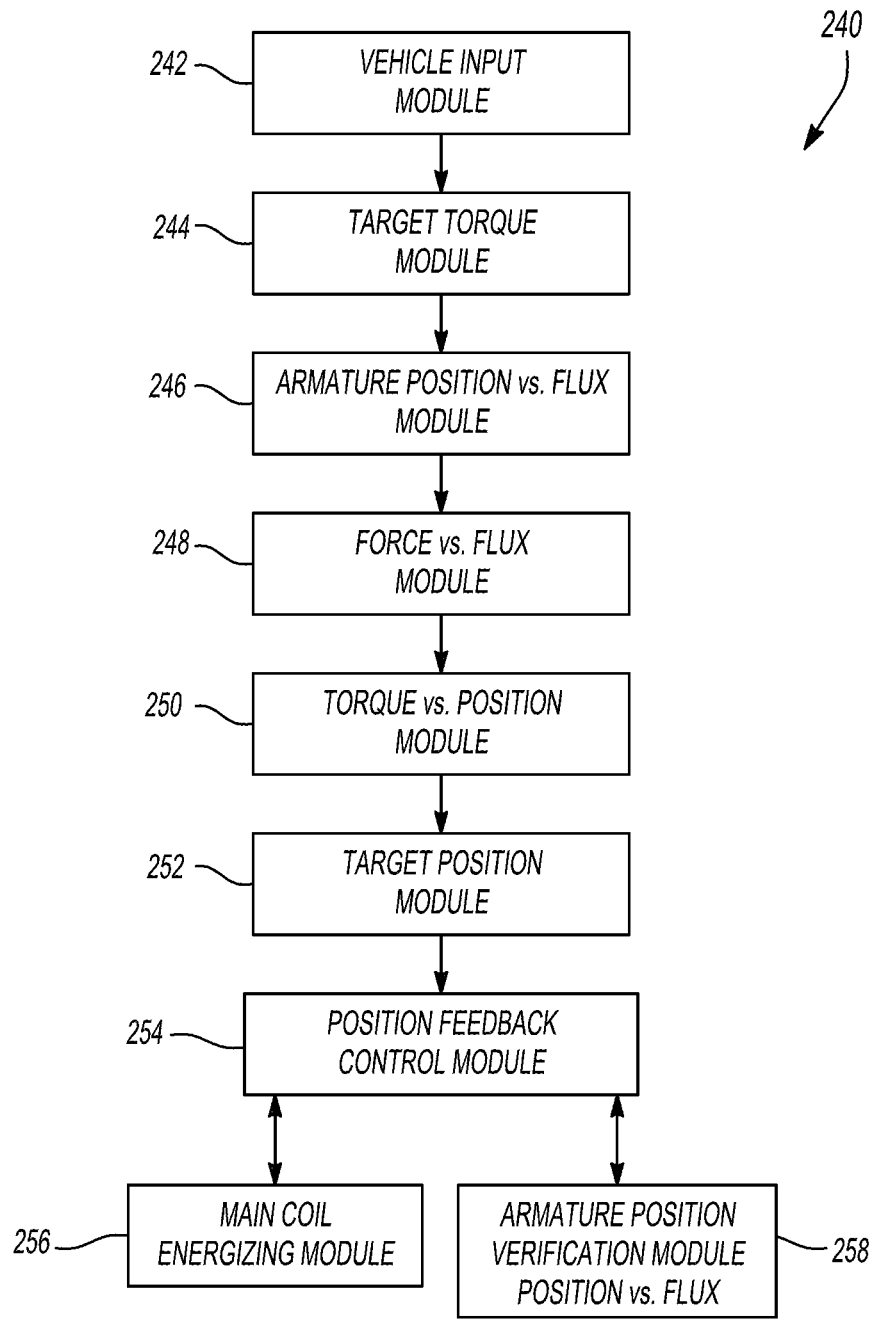
FIG. 8 is a flow diagram depicting position control of the torque coupling.

FIG. 8 provides a logic diagram relating to an actuator control system 240 for the control of torque coupling 220. Control system 240 includes a vehicle input module 242 for collecting the data provided by vehicle sensors 54. A target torque module 244 is in receipt of the data from vehicle input module 242 and determines a target torque to be generated by transfer clutch 50.

Control system 240 also includes a series of control modules associated with the individual torque characteristics of each torque coupling 220 manufactured. It is contemplated that modules 246, 248 and 250 are envoked at the manufacturing facility during a final torque coupling test prior to installation on a vehicle. By testing and collecting various data for each torque coupling in this manner, a number of manufacturing variables including dimensional stack-ups, friction coefficients, component compliance and assembly variations may be taken into account.

Figure 9:
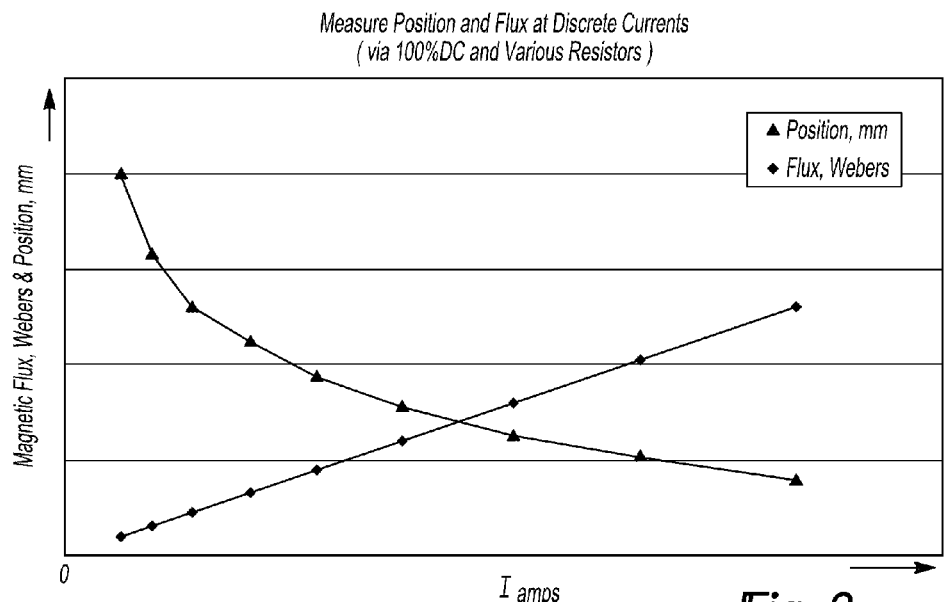
FIG. 9 is a graph correlating armature position and magnetic flux at discrete currents.

An armature position vs. flux module 246 generates a magnetic flux vs. current data set and an armature position vs. current data set as represented by the curves shown at FIG. 9. It should be noted that when armature 102 is furthest from coil assembly 98, the magnetic flux acting on armature 102 is at a minimum. As armature 102 moves toward coil assembly 98, magnetic flux increases. It should be appreciated that module 246 not only incorporates the change in gap 108 as armature 102 moves toward coil assembly 98, but also accounts for component compliance after apply plate 96 has caused each of inner clutch plates 92 to engage outer clutch plates 94.

Figure 10:
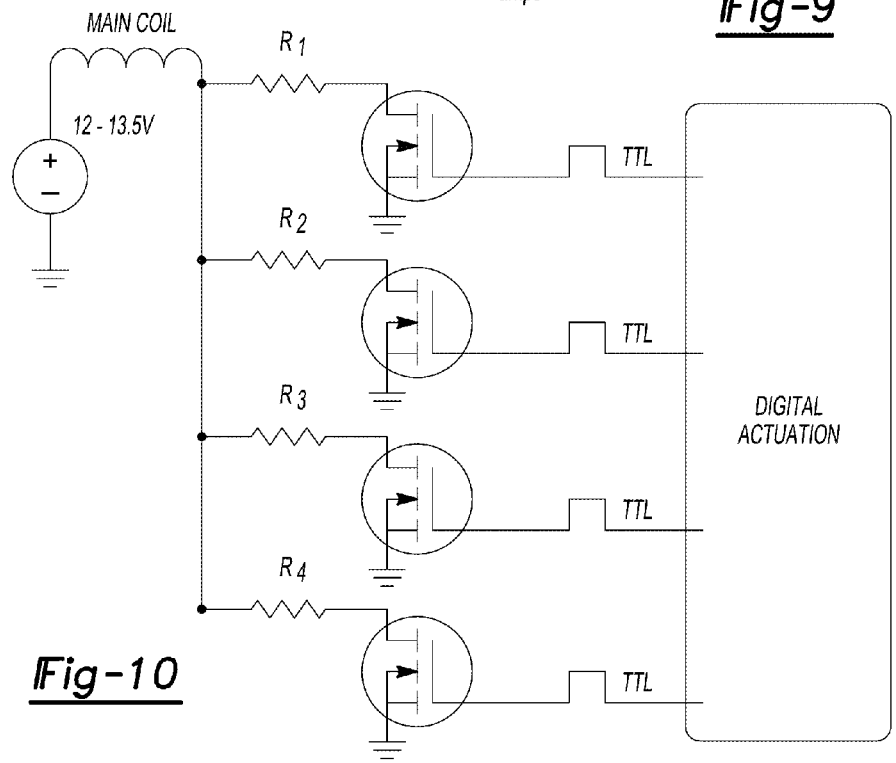
FIG. 10 is an electrical schematic relating to applying discrete voltages to a torque coupling actuator.
Figure 11:
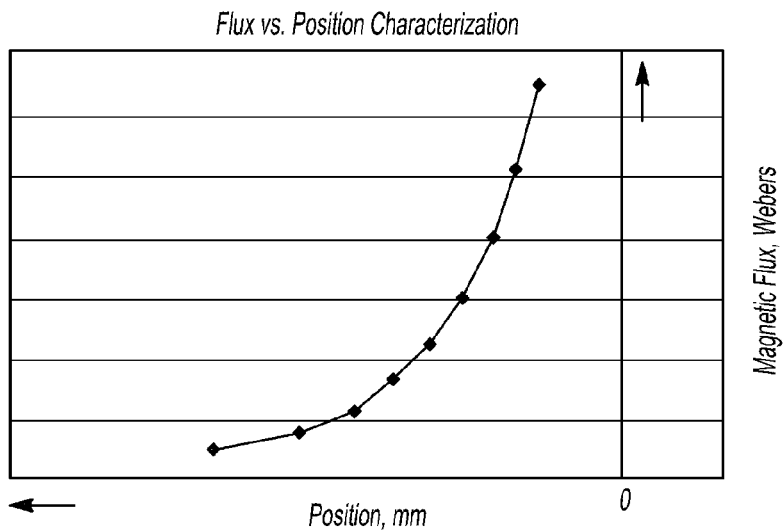
FIG. 11 is a graph depicting magnetic flux vs. armature position.

It is contemplated that the magnetic flux vs. current and armature position vs. current curves may be generated by applying a 100% pulse width modulation duty cycle to main coil 100. Discrete voltages of different magnitude may be provided to main coil 100 through the use of a number of resistors R1, R2, R3 and R4 arranged in parallel as shown in FIG. 10. Using the information from FIG. 9, module 246 defines the relationship between magnetic flux and armature position as shown in FIG. 11.

During laboratory testing of torque coupling 220, it was determined that controlling the torque output of transfer clutch 50 via current control included several challenges such as accounting for a relatively large inrush of current when power was initially provided to main coil 100. A relatively large hysteresis exists in the current vs. torque curve during switching on and off of the current to coil assembly 98. The present control scheme of applying a 100% duty cycle in combination with various resistors minimizes the hysteresis associated with the application of current to main coil 100 and allows computation of an accurate armature position vs. magnetic flux trace as determined by module 246 and depicted at FIG. 11.

Figure 12:
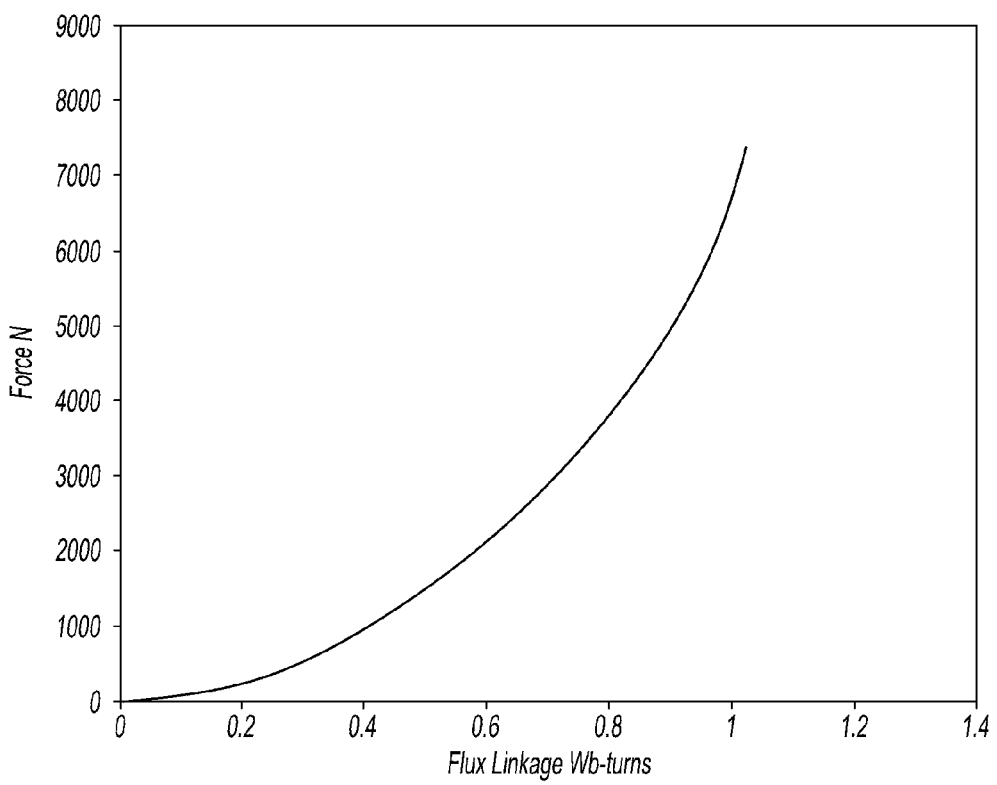
FIG. 12 is a graph depicting force as a function of flux linkage.

Module 248 determines the force acting on armature 102 as a function of magnetic flux. As shown in FIG. 12, the force applied to armature 102 varies as a function of magnetic flux density. More particularly, the force F acting on armature 102 given by the following equation:

$$F = \frac{B^2 A_2}{2\mu_0}$$

where $$B = \frac{\Phi}{A_1}$$

$A_2$=Area 2
$\mu_0$=4×n×10$^{-7}$
$\Phi$=N$\oint$ Vdt
$A_1$=Area 1

Once the apply force to transfer clutch 50 is known, a torque vs. position module 250 estimates the torque transferred between input member 76 and output member 78 based on the friction coefficients between the surfaces of inner clutch plates 92 and outer clutch plates 94, the radii at which they contact, and a number of other factors such as operating temperature, relative speed between input member 76 and output member 78 and others. FIG. 13 provides an estimate of torque across transfer clutch 50 based on armature position and operation at a 100% duty cycle. Alternatively, and as previously described, the torque generated by coupling 220 may be directly measured at the manufacturing facility prior to installation within vehicle 10.

The relationship of torque vs. position is stored within or is accessible to controller 58 such that position data provided by sensors 118a, 118b or 118c may be taken into account when attempting to provide the target coupling torque determined by module 244. Once modules 246, 248 and 250 have generated a torque vs. position trace, coupling 220 may be installed within a vehicle.

Target position module 252 determines a target armature position based on the target torque determined by module 244 and the information stored within torque vs. position module 250. A position feedback control module 254 is in communication with position sensors 118 and compares the actual position of armature 102 to the target position defined by module 252. If the actual armature position is not within a predetermined tolerance of the target armature position, main coil energization module 256 varies a magnitude of an electrical input to main coil 100 to provide closed loop position control of armature 102.

From time to time, it may be desirable to verify the position of armature 102 with another method other than the use of position sensors 118. An armature position verification module 258 performs an armature position vs. magnetic flux data collection sequence using resistors R1, R2, R3 and R4 at a 100% duty cycle as previously described. The armature position vs. flux curve previously defined by module 246 at the manufacturing facility is compared with the verification trace generated by module 258. If the variance between the two curves exceeds a predetermined quantity, an error signal may be provided. It is contemplated that armature position verification module 258 may function during a torque request while the motor vehicle is moving or at a time when the vehicle is not moving and a target torque request is zero.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A torque transfer device for a motor vehicle, comprising:
   a first shaft;
   a second shaft;
   a clutch for transferring torque between the first and second shafts;
   an electromagnetic actuator including an axially moveable armature for applying an application force to the clutch; and
   an actuator control system including a position sensor operable to output a signal indicative of a position of the armature, the control system determining a target torque to be transferred by the clutch and a target armature position based on a previously determined clutch torque vs. armature position relationship, the control system being operable to vary an electrical input to the electromagnetic actuator to perform closed loop control of the armature position.

2. The torque transfer device of claim 1 wherein the position sensor includes a probe contacting the armature.

3. The torque transfer device of claim 1 wherein the position sensor is fixed to a stator of the electromagnetic actuator.

4. The torque transfer device of claim 1 wherein the position sensor is fixed to a housing containing the clutch.

5. The torque transfer device of claim 1 wherein the target torque is determined by evaluating vehicle operating characteristics including vehicle speed and throttle position.

6. The torque transfer device of claim 1 further including a distance multiplier coupled to the armature, the position sensor being operable to output a signal indicative of a multiplied distance traversed by the armature, the control system calculating an actual distance traveled by the armature based on the multiplied distance and a multiplier constant.

7. The torque transfer device of claim 6 wherein the distance multiplier includes a rack and pinion gear.

8. The torque transfer device of claim 6 wherein the distance multiplier includes a lever.

9. The torque transfer device of claim 1 wherein the position sensor includes an optical sensor.

10. A torque transfer device for a motor vehicle, comprising:
   a first shaft;
   a second shaft;
   a clutch for transferring torque between the first and second shafts;
   an electromagnetic actuator including a main coil and an axially moveable armature for applying an application force to the clutch;
   an actuator control system including a position sensor providing a signal indicative of a position of the armature, the control system being operable to vary an electrical input to the electromagnetic actuator to perform closed loop control of the armature position; and
   an armature position verification system including a search coil providing a signal indicative of a magnetic flux generated by the main coil, the verification system comparing the magnetic flux and the corresponding armature position signal to a predetermined flux and armature position relationship to verify the armature position.

11. The torque transfer device of claim 10 wherein the actuator control system includes an armature vs. magnetic flux module for determining an armature position to magnetic flux relationship.

12. The torque transfer device of claim 11 wherein the actuator control system includes a force vs. magnetic flux module for determining a relationship between an armature force and magnetic flux.

13. The torque transfer device of claim 10 wherein the search coil is mounted within a housing containing the main coil.

14. The torque transfer device of claim 10 wherein the armature position verification system includes a plurality of selectively switched resistors in communication with the main coil to provide a number of different electrical inputs to the main coil.

15. The torque transfer device of claim 10 wherein the actuator control system includes providing electrical input to the electromagnetic actuator with pulse width modulation.

16. A method of controlling an electromagnetic actuator for a clutch transferring torque between first and second shafts of a power transmission device in a vehicle, the method comprising:
   determining vehicle operating characteristics;
   determining a target clutch torque based on the vehicle operating characteristics;
   determining a target position of an armature within the actuator based on the target torque;
   determining an actual armature position based on a signal provided by a position sensor;
   determining whether the actual armature position is within a predetermined tolerance of the target armature position; and
   performing closed loop position feedback control by varying an electrical input to the electromagnetic actuator to control the position of the armature based on the position sensor signal.

17. The method of claim 16 further including storing torque vs. armature position information during clutch testing prior to installation of the clutch within the vehicle, wherein the target armature position determination is based on the information.

18. The method of claim 17 further including storing magnetic flux data corresponding to the torque vs. armature position information.

19. The method of claim 18 further including verifying the armature position during vehicle operation by comparing flux and armature position signal data collected during vehicle operation to the stored data and outputting a fault signal when an error exists.

20. The method of claim 16 further including engaging a probe of the position sensor with the armature.

\* \* \* \* \*